United States Patent
Miyauchi et al.

[11] Patent Number: 6,075,765
[45] Date of Patent: *Jun. 13, 2000

[54] INFORMATION RECORDING AND REPRODUCING APPARATUS, A CARTRIDGE FOR USE IN THE SAME, AND AN INFORMATION RECORDING AND REPRODUCING SYSTEM HAVING THE APPARATUS

[75] Inventors: Yasushi Miyauchi, Akishima; Motoyasu Terao, Hinode-Machi; Hiroyuki Kimura, Hiratsuka, all of Japan

[73] Assignees: Hitachi, Ltd., Tokyo; Hitachi Maxell, Ltd., Oosaka, both of Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/748,806

[22] Filed: Nov. 15, 1996

[30] Foreign Application Priority Data

Nov. 17, 1995 [JP] Japan ..................... 7-299546

[51] Int. Cl.[7] .............. G11B 3/70; G11B 23/03
[52] U.S. Cl. ........................... 369/291; 360/133
[58] Field of Search ................ 360/133, 99.02, 360/99.06; 369/291, 77.1, 77.2, 75.1–75.2

[56] References Cited

U.S. PATENT DOCUMENTS

| | | |
|---|---|---|
| 4,542,495 | 9/1985 | Ziegler et al. ................... 369/273 |
| 4,740,948 | 4/1988 | Nakamori et al. ............... 369/291 |
| 5,150,354 | 9/1992 | Iwata et al. ..................... 360/133 |
| 5,293,293 | 3/1994 | Iwata et al. ..................... 360/133 |
| 5,548,577 | 8/1996 | Miyazaki et al. ............... 369/291 |
| 5,748,609 | 5/1998 | Tanaka ............................ 369/291 |
| 5,757,764 | 5/1998 | Tanaka ............................ 369/291 |
| 5,796,713 | 8/1998 | Tanaka ............................ 369/291 |

FOREIGN PATENT DOCUMENTS 60-237690  11/1985  Japan ........................... 360/133

OTHER PUBLICATIONS

IBM Technical Disclosure Bulletin (vol. 18, No. 10, Mar. 1976, pp. 3397–3399).

*Primary Examiner*—Allen T. Cao
*Attorney, Agent, or Firm*—Fay, Sharpe, Beall, Fagan, Minnich & McKee

[57] ABSTRACT

An information recording and reproducing apparatus that prevents an information recording medium from being taken out of its cartridge inadvertently. The information recording medium allows recording information thereon by irradiation of an energy beam. The cartridge comprises a body and a cap adapted to a separable from the body or opened/closed thereon. An information recording medium is accommodated in the cartridge to allow recording and reproducing of information by irradiation of the energy beam. The cartridge also has locking member for fixing the body and the cap together in a closed state. If the information recording medium needs to be taken out of the cartridge after the same has been set on the recording and reproducing apparatus, the locking member is released to make the cap separable from the body or open on the body and the cartridge is ejected from the recording and reproducing apparatus.

13 Claims, 10 Drawing Sheets

FIG. 7
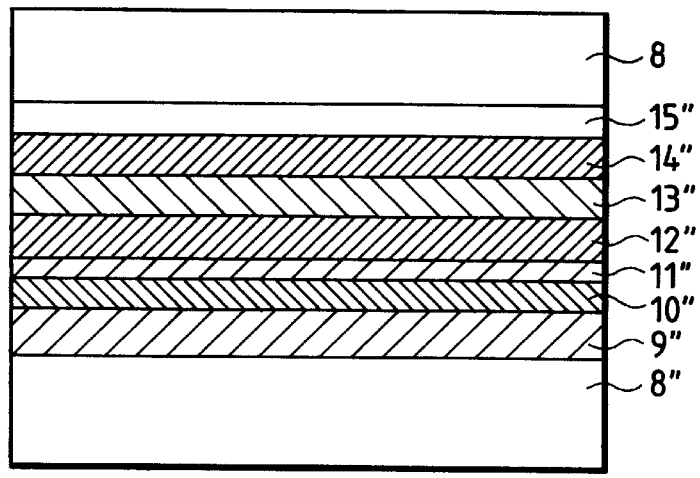
FIG. 8(a) FIG. 8(b) FIG. 8(c)
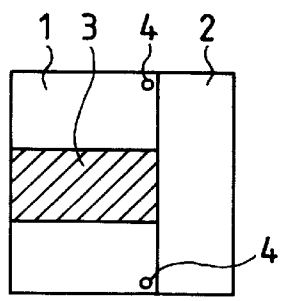 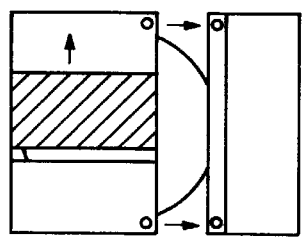 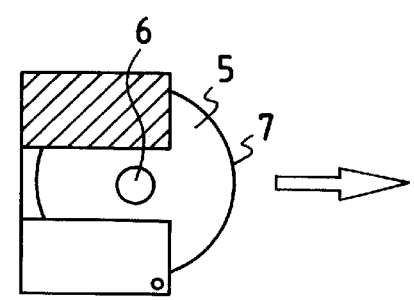

INFORMATION RECORDING AND REPRODUCING APPARATUS, A CARTRIDGE FOR USE IN THE SAME, AND AN INFORMATION RECORDING AND REPRODUCING SYSTEM HAVING THE APPARATUS

BACKGROUND OF THE INVENTION

The present invention relates to an information recording and reproducing apparatus capable of, by use of a recording energy beam such as laser beam, real-time recording digital information such as data processed by electronic computers and digitizing information such as video for recording, a cartridge for use in this apparatus, and an information recording and reproducing system having the above-mentioned information recording and reproducing apparatus.

Recently, high-density, large-capacity read-only digital video discs (DVD-video and DVD-ROM) have been developed and a rewritable digital video disc (DVD-RAM) is under development for next-generation information storage media.

The CD-ROM and the CD-R, which are conventional information recording and reproducing discs, a disc is taken out of its casing to be set on a recording and reproducing apparatus or a reproducing apparatus or accommodated in a casing called a caddy having an open/close cap before being set on these apparatuses for recording or reproduction. With a magneto-optical (MO) disc, the disc is accommodated in its dedicated cartridge to be set on a recording and reproducing apparatus for recording or reproduction. The MO disc cannot be taken out of the cartridge. If the disc is taken out by breaking the cartridge, there is no apparatus that can accept the bare disc to read information from the same.

In information storage medium of the DVD-RAM type (hereafter, an example disc, which is a general recording medium will be described) has a high recording density and ensures rewriting multiple times. Therefore, it is desired to accommodate the disc in a dedicated cartridge for enhanced reliability. However, it is sometimes desired to read information from a disc accommodated in the cartridge on a read-only DVD-ROM apparatus that has no capability for loading such a disc. If an attempt is made to take the disc out of its cartridge, set the disc on a DVD-ROM apparatus for reading information, and accommodate the disc in its cartridge again for recording information, the following problems may be encountered.

When the disc is taken out of its cartridge, the disc may be contaminated with finger print, dirt, or other undesirable foreign materials to impair proper recording of information. Further, if a disc is taken out of its cartridge without checking contents (for example, remaining recording capacity) of the disc, the same may be unrecordable after it is barely used.

In addition, when a disc is accommodated in its cartridge again, the disc may be inserted with sides inverted or another optical disc (for example, a music CD, a CD-ROM, or a CD-R) may be inserted erroneously.

SUMMARY OF THE INVENTION

It is therefore a first object of the present invention to provide a cartridge that prevents an information recording medium from being taken out the cartridge inadvertently.

It is a second object of the present invention to provide an information recording and reproducing apparatus that prevents an information recording medium from being taken out of its cartridge inadvertently.

It is a third object of the present invention to provide an information recording and reproducing system having the above-mentioned information recording and reproducing apparatus.

To achieve the above-mentioned first object, there is provided a cartridge having a body and a cap with the cap being adapted to be separated or opened from the body. An information recording medium is accommodated in the cartridge for recording and reproducing information thereto and therefrom by irradiation of an energy beam. At least one side of the cartridge has a structure for recording and reproducing the information to and from the information recording medium and fixing means for fixing the cap with the body in a closed state. The structure for recording and reproducing the information to and from the information recording medium is a shutter, by way of example, for opening and closing a window provided on the cartridge for allowing a recording and reproducing head to access the information recording medium through the window. Also, the structure for recording and reproducing the information to and from the information recording medium may have a thickness and a material on at least one portion of the cartridge, the thickness and the material letting an energy beam for recording and reproducing the information to pass the at least one portion of the cartridge. The above-mentioned structure may be provided on one or both sides of the cartridge.

Preferably, the cartridge has means for telling the apparatus or the user the state of the information recording medium; namely, whether the information recording medium has never been taken out of the cartridge, the information recording medium was taken out and reinserted in the cartridge, or the reinserted information recording medium is a DVD-RAM disc and has been reinserted with both sides directed properly.

To achieve the above-mentioned second object, there is provided an information recording and reproducing apparatus comprising one of the above-mentioned cartridges, a head for recording and reproducing the information to and from the information recording medium; and releasing means for releasing the fixing means to separate the body and the cap from each other or open the cap from the body.

Recording and reproducing information with the above-mentioned cartridge set on the information recording and reproducing apparatus follow the process that follows.

For the cartridge of which the information recording medium in the cartridge is a disc and the structure for recording and reproducing information is a shutter, the shutter is opened to provide a window ranging from the center hole of the disc to its outer rim. The cartridge is moved near the motor spindle and the center hole is mated with the spindle. The head for recording and reproducing information is moved near the disc through the window and the disc is rotated for information recording or reproducing.

For the card-like cartridge, one side of which has a thickness and a material that permits transmission of an energy beam for information recording and reproducing, the disc is rotated by remote driving means such as a magnet to perform information recording and reproducing through the head from outside the body of the cartridge.

Various other processes are available, in one of which the window is restricted to the portion of the center hole and the recording and reproducing are performed from outside the body of the cartridge but the disc is rotated by inserting the motor spindle directly in the center hole, by way of example. In any case, preferably, the recording and reproducing apparatus comprises a head having a laser beam source and a focusing means for focusing a laser beam coming from the laser beam source onto the information recording medium, and the recording and reproducing apparatus at least has a laser driving means for driving the laser beam source and adjusting means for automatically adjusting focus and tracking of the laser beam irradiated onto the information recording medium.

To achieve the above-mentioned third object, there is provided an information recording and reproducing system comprising one of the above-mentioned information recording and reproducing apparatus and a control unit (for example, a computer or a set top box of television) for controlling the information recording and reproducing apparatus wherein the control unit is at least installed with a program for reconfirming taking out the information recording medium from the cartridge.

Preferably used for the recording film of the information recording medium for use in the present invention is an amorphous-crystalline phase-change recording film providing high-speed crystallization, a recording film using inter-amorphous change, a recording film using an inter-crystalline phase change such as change in crystal system or crystal grain size, or a magneto-optical recording film. It will be apparent that other recording films are also available including such recording films using phase change as Ge-Sb-Te type film and Ag-In-Sb-Te type film and recording films obtained by adding high-melting-point materials such as Cr-Te and Ag-Te that melt at temperatures higher than the melting point of the main component of the recording film.

It will also be apparent that the present invention is applicable to not only a disc-shaped information recording medium but also recording media of other shapes such as a card.

BRIEF DESCRIPTION OF THE DRAWINGS

FIG. 7 is a cross-sectional view illustrating the disc used in a second preferred embodiment of the invention;

FIG. 8(a) is a top view illustrating a structure of a cartridge practiced as a third preferred embodiment of the invention;

FIG. 8(b) is a schematic diagram illustrating a state in which a disc is taken out of the cartridge of the third preferred embodiment;

FIG. 8(c) is another schematic diagram describing a state in which the disc is taken out of the cartridge of the third preferred embodiment;

DETAILED DESCRIPTION OF PREFERRED EMBODIMENTS

This invention will be described in further detail by way of example with reference to the accompanying drawings.

Figures 1A, 1B, 1C:
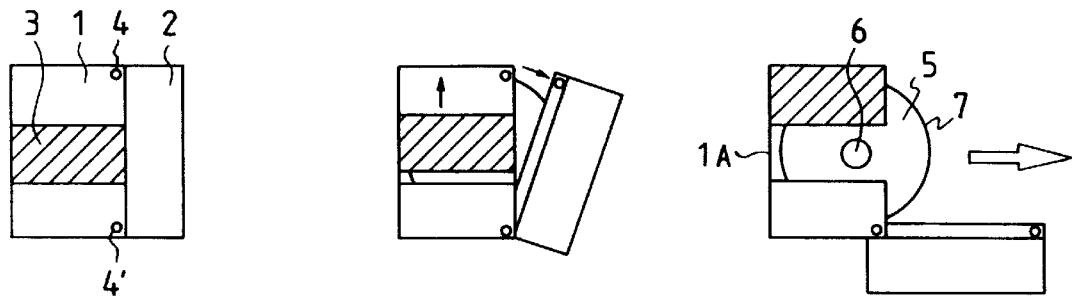
FIG. 1(a) is a top view illustrating a structure of a cartridge practiced as a first preferred embodiment of the invention.
FIG. 1(b) is a schematic diagram illustrating a state in which a disc is taken out of the cartridge of the first preferred embodiment.
FIG. 1(c) is another schematic diagram illustrating a state in which a disc is taken out of the cartridge of the first preferred embodiment.

Referring to FIG. 1(a), there is shown a top view of a structure of a cartridge practiced as the first preferred embodiment of the invention. Referring to FIGS. 1(b) and 1(c), there are shown schematic diagrams illustrating the states in which the disc is taken out of the cartridge of FIG. 1(a). As shown, the cartridge has a structure that allows the handling of the disc housed in the cartridge almost without touching the major surfaces of the disc. As shown in FIG. 1(a), the cartridge comprises a body 1, a cap 2, a pin 4 for fixing or locking the body 1 and the cap 2 together in the closed state, a shutter 3, and a disc accommodated inside the cartridge. In addition to the above-mentioned components, the cartridge includes an indicator pin, not shown, to be described later. The width (the right and left direction in the figure) of the cap 2 is about ⅓ of the width (the width of the body and the cap when the same is closed) of the cartridge. It is desired that this width be less than ½ and more than ⅒ of the cartridge width.

When the disc is taken out of the cartridge, a preliminary operation for taking out the disc is first performed on the recording and reproducing apparatus (DVD-RAM apparatus in this example) to unlock the pin 4. A more specific method of this unlocking will be described later. When the pin 4 is unlocked, the cap 2 swings in one direction around a pin 4' as shown in FIG. 1(b). When taking out the disc 5, the shutter 3 is slid in the upward direction as shown in FIG. 1(c) to open a window 1A and expose a center hole 6 of the disc and an outer periphery 7 of the disc. In this state, holding the disc by fingers at the center hole 6 and the outer periphery 7, the disc 5 is pulled out of the body 1 to the right side in the figure. Thus, holding the disc at the center hole 6 and the outer periphery 7 hardly attaches finger prints or the like on the disc surfaces. Because a window is open in the direction in which the disc is taken out of the body, a finger or a rod-like material can be placed in the center hole at approximately right angles thereto to take the disc out of the cartridge without being hindered by anything. This structure of the cartridge prevents the disc surfaces from being contaminated with finger prints or scratched. Further, it is desired for the pin 4 to have a structure in which the same is released or unlocked to make separation or release between the body and the cap only through releasing means of the recording and reproducing apparatus on which the cartridge is set. In other words, it is desired for the pin 4 to have a structure in which same cannot be easily released or unlocked by users or with ordinary tools.

Figure 5:
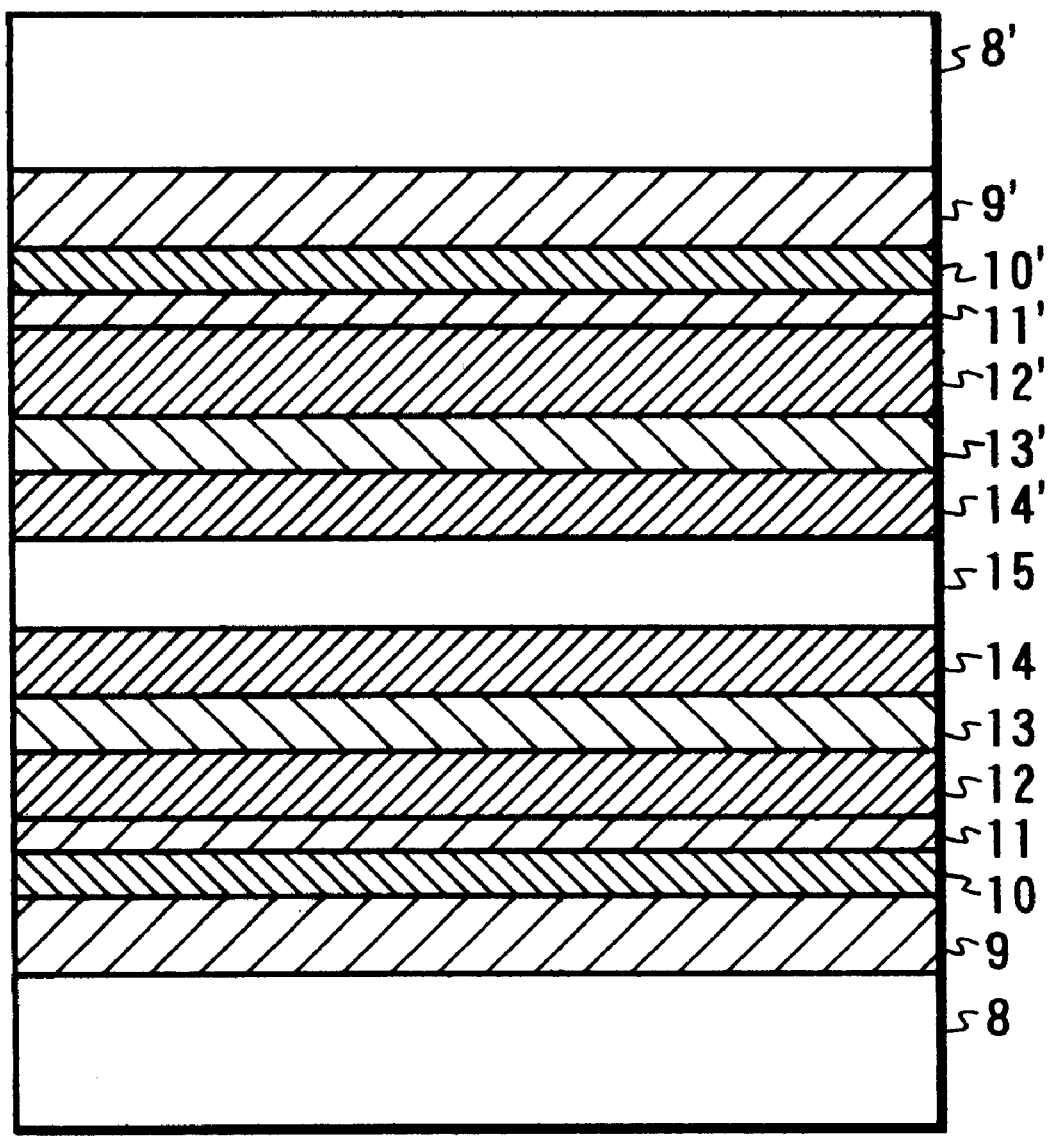
FIG. 5 is a cross-sectional view illustrating a structure of the disc used in the first preferred embodiment.

Referring to FIG. 5, a cross section of the structure of the disc used in the present embodiment is shown. As shown, a dielectric material layer 9 made of ZnS-SiO having a thickness of about 110 nm is formed on a polycarbonate substrate 8 having a diameter of about 120 cm and a thickness of about 0.6 mm by magnetron spattering process. Then, a recording film 10 made of Cr-Ge-Sb-Te is formed on the dielectric material layer to a thickness of about 20 nm. Another dielectric material layer 11 made of ZnS-SiO is formed on the recording film 10 to a film thickness of about 20 nm. Further, an Si layer 12 is formed on the dielectric material layer 11 to a thickness of about 100 nm, which in turn has formed thereon an Mo reflection layer 13 to a thickness of about 100 nm. These films are formed sequentially in a same spattering unit. Then, a UV-light curing resin layer 14 is formed on the Mo reflection layer.

Also, another substrate 8' is formed likewise with a dielectric material layer 9', a recording film 10', another dielectric material layer 11', an Si layer 12', an Mo reflection layer 13', and an UV-light curing resin layer 14'. Both are closely bonded together with an adhesive 15 to provide a bonded disc having a double recording capacity.

Figure 12:
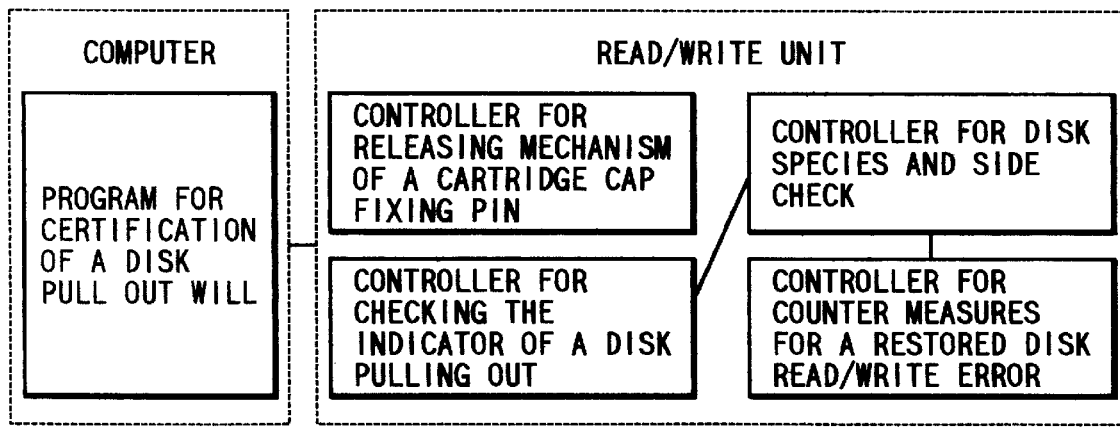
FIG. 12 is a block diagram illustrating an example of the recording and reproducing system according to the invention.

The following describes a recording and reproducing system practiced as one preferred embodiment of the present invention with reference to FIG. 12. This recording and reproducing system comprises a recording and reproducing apparatus on which a cartridge such as the one described above is set and a computer (a personal computer for example). The personal computer is installed with a device driver software including a program for confirming an intention of taking out the disc.

Figure 4:
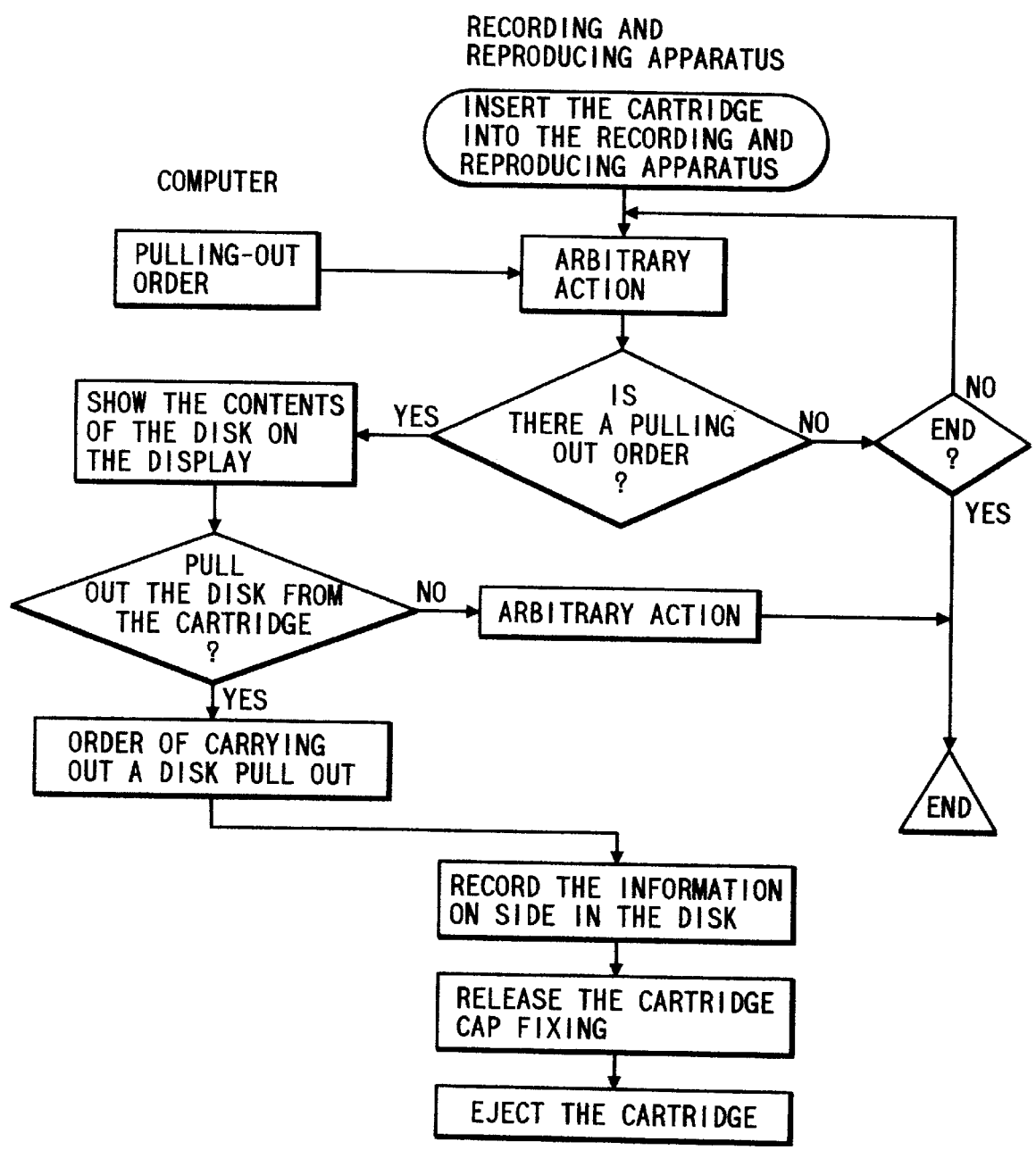
FIG. 4 is a flowchart indicating operations of a recording and reproducing system of the first preferred embodiment.

Referring to the flowchart of FIG. 4, an operation of the recording and reproducing system will be described. First, the cartridge is loaded in the recording and reproducing apparatus. After automatically checking to see that the cartridge is new one by a method to be described, a desired operation is performed. For a double-sided disc, which side (side A or side B) is on the recording/reproducing head can be determined by a notch provided on one edge of the cartridge. It will be apparent that the notch may be a hole. To take the disc out of the cartridge, the user issues a "take out" instruction from the personal computer by operating the keyboard or the mouse thereof or by pressing the corresponding push-button of the recording and reproducing apparatus. Based on the instruction, the personal computer controlling the recording and reproducing apparatus checks the contents of the loaded disc to show the check results on the display and provides a message for reconfirming whether the disc is to be taken out. The contents of the disc herein denote a used capacity, a free capacity, titles of the information stored on the disc, and so forth. By checking these contents, the user determines whether to take the disc out of the cartridge or not. To stop taking out the disc, the user issues a "cancel" instruction according to the message given by the personal computer. Then, the recording and reproducing apparatus moves to a desired operation. To take out the disc, the user inputs "Yes" according to the message given by the personal computer. Then the personal computer issues a "execute take-out" instruction to the recording and reproducing apparatus. When the "execute take-out" instruction is issued, the recording and reproducing apparatus records, on the side of the disc being read, a marker that indicates the final read side is the front side or the back side (side A or Side B). For example, if the side being read is the front side (side A), the computer additionally records a number indicating the front side at a predetermined position (to be specific, a control track or a recording area near the same). It is further desirable that the user reverses the sides of the cartridge and performs the same operation beforehand. Reproducing the recorded marker allows the user to know the sides of a disc whose side A or side B is not recorded on the disc beforehand. Therefore, when the disc has been put in the cartridge again, the user knows if the cartridge is placed on the correct side. The above-mentioned additional recording operation may be performed after the disc take-out instruction is issued and before the cartridge is ejected outside the recording and reproducing apparatus.

Next, the personal computer mechanically releases or unlocks the fixing of the cap by the pin 4 of the cartridge. If the operations up to effecting the state in which the disc can be taken out of the cartridge are performed at the side of the recording and reproducing apparatus, the disc is prevented from being taken out inadvertently. Then, finally, the cartridge with the cap fixing by the pin 4 released is ejected outside the recording and reproducing apparatus.

Figure 11:
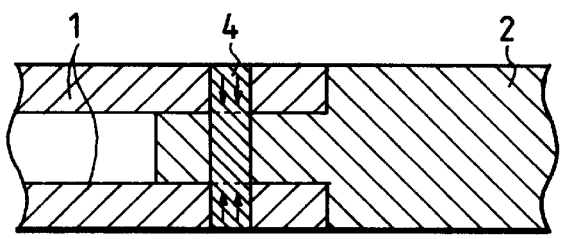
FIG. 11 is a cross-sectional view illustrating a portion around a pin of the cartridge of the first preferred embodiment of the invention.

The following describes a method of releasing the fixing of the cap by the pin 4 with reference to FIG. 11. The body 1 and the cap 2 of the cartridge are fixed together with the pin 4 made of expanded plastic. A fixing release mechanism of the recording and reproducing apparatus presses the pin 4 up and down to collapse the pin 4 to positions indicated by dashed lines, thereby letting the cap 2 move to the right in the figure.

Figure 13:
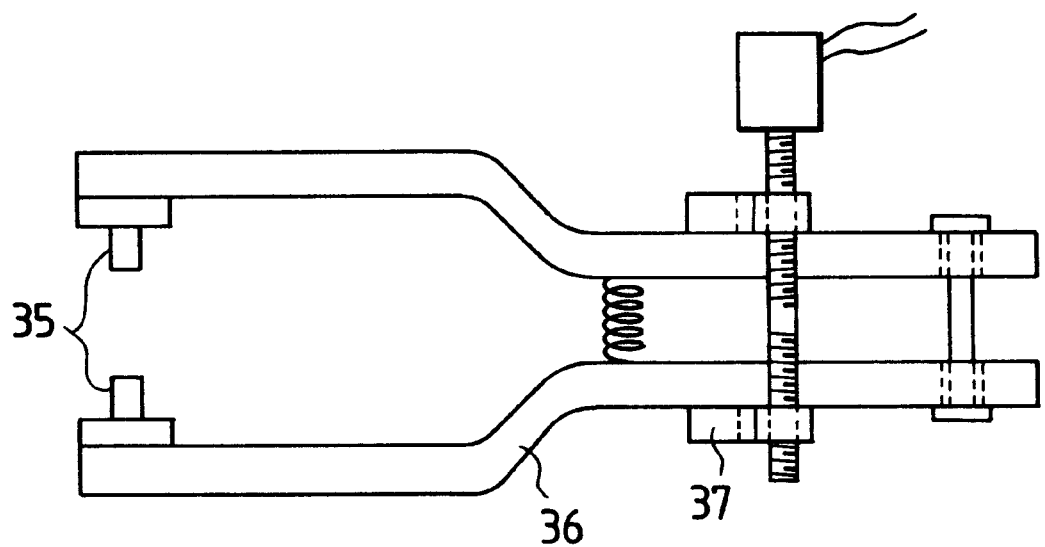
FIG. 13 is a schematic view illustrating a fixing release mechanism of a cap of the cartridge for use in the recording and reproducing apparatus according to the invention.

FIG. 13 shows a schematic view of the fixing release mechanism. As shown, two arms 36 each having a punch pin 35 are joined at one end with a bolt, the center portion passing between strip members 37. The two strip members 37 have thread holes which are reverse to each other in thread. One screw mated with both thread holes is rotated by a motor. The rotation of the screw moves the strip members 37 toward each other to narrow the interval between the punch pins 35, thereby compressing the pin 4.

In addition to the above-mentioned method, a method, among others, is available in which portions around the pin 4 of the body 1 of the cartridge are trenched to expose both ends of the pin 4 and the exposed ends of the pin 4 are broken by the fixing release mechanism of the recording and reproducing apparatus. This method, however, requires to have means for storing the broken ends of the pin and eject the broken ends outside the recording and reproducing apparatus. As these examples show, with the shape of the pin that changes irreversibly, when the disc taken out is returned into the cartridge, recording and reproducing on the disc are generally rejected by the recording and reproducing apparatus except for a case to be described later.

It will be apparent that the pin 4 may move reversibly. For example, in generally the same mechanism as that of FIG. 13, one of the arms is fixed and the above-mentioned motor is driven to move a metal pin in one of the directions.

From the cartridge ready for ejecting the disc, the user takes out the same while paying attention so as not to attach finger prints on the major sides of the disc and loads the disc on a DVD-ROM apparatus for reproducing information.

Figure 6:
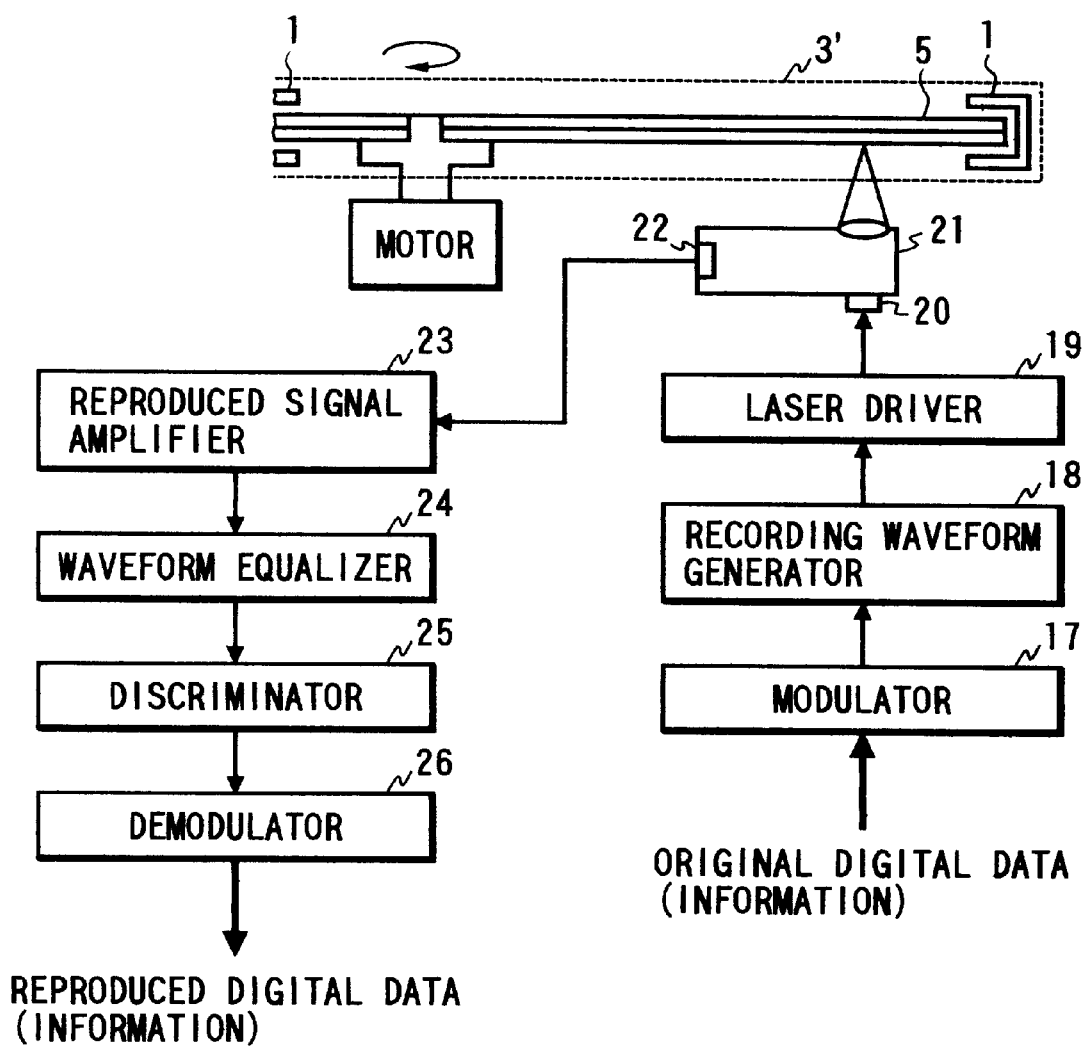
FIG. 6 is a diagram illustrating a structure of recording and reproducing systems of the recording and reproducing apparatus of the first preferred embodiment.

FIG. 6 shows an example of a structure of recording and reproducing circuitry in the recording and reproducing apparatus of the present embodiment. A shutter, not shown, located at a shutter position 3' moves toward the back side, for example, to provide a window for the body 1 of the cartridge, a semiconductor laser 20 approaches the window to enable information recording and reproducing.

At recording, an original information signal (information) to be recorded is inputted in a modulator 17 for conversion to recording codes to be used. Then, a recording waveform corresponding to a desired recording code is generated by a recording waveform generator 18 to be output as recording pulse signals having various powers. Based on this recording pulse, a laser driver 19 modulates a driving current of the semiconductor laser 20, irradiates a focused laser beam onto the rotating disc 5 through an optical head 21, and forms a recording marker. At reproduction, search for a desired address portion on the disc 5 is made by moving the optical head and focus lens. The laser beam reflected from the address portion is picked up by a light detector 22 to be converted to an electrical signal. The electrical signal is inputted in an equalizer 24 via amplifier 23. The resultant signal outputted from the equalizer 24 is converted to a digitized waveform. Finally, the digitized signal provides a data bit string (information) via a discriminator 25 and a demodulator 26. It will be apparent that the optical head may be on both sides of the disc or movable from one side to the other along the outside of the disc. If the optical head is provided on both sides of the disc, recording and reproducing can be made simultaneously for a relatively high data transfer rate and obviation of necessity for turning the disc upside down.

Figure 2A:
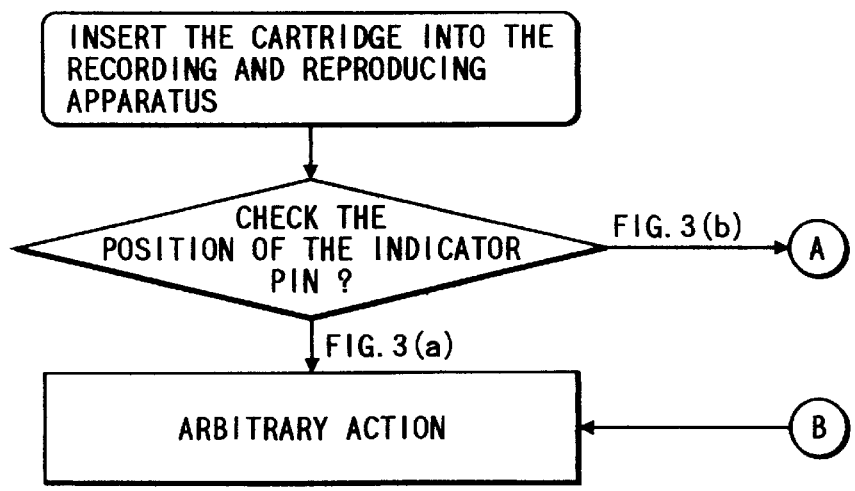
FIG. 2(a) and FIG. 2(b) are flowcharts indicating operations of a recording and reproducing apparatus of the first preferred embodiment.
Figure 2B:
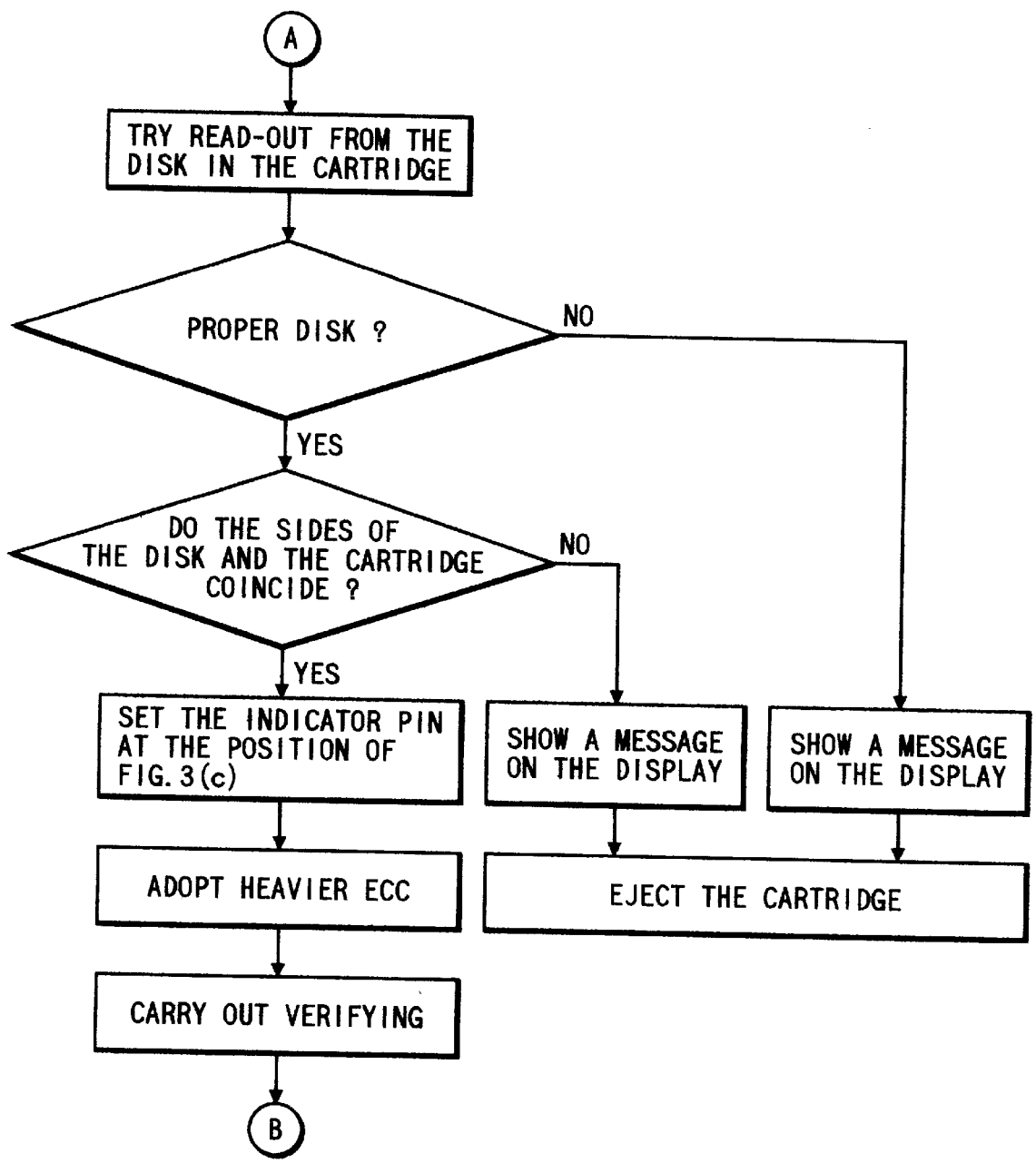

The following describes an operational procedure for ejecting the cartridge from the recording and reproducing apparatus, the cartridge housing the recorded disc, taking the disc from the cartridge, storing the disc in the cartridge again, and recording and reproducing information to and from the disc. FIG. 2(a) and FIG. 2(b) are flowcharts describing operation of the recording and reproducing apparatus.

Figure 3A:
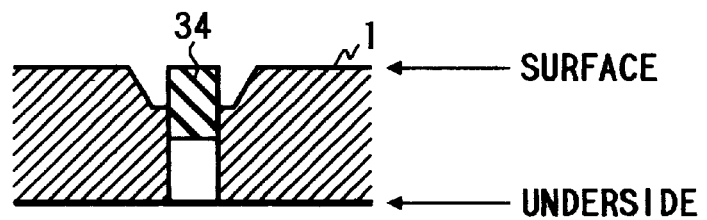
FIG. 3(a), FIG. 3(b), and FIG. 3(c) are cross-sectional views illustrating an indicator pin of the cartridge of the first preferred embodiment.
Figure 3B:
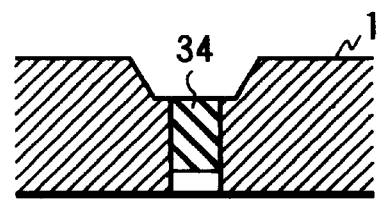
Figure 3C:
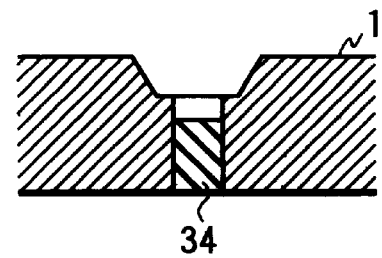

First, the cartridge is inserted in the recording and reproducing apparatus as shown in FIG. 2(a). The recording and reproducing apparatus automatically checks the position of the indicator pin 34 provided on the cartridge. The position of the indicator pin 34 comes to one of three positions shown in FIGS. 3(a), 3(b) and 3(c) depending on the state. For example, FIG. 3(a) shows a state of the indicator pin 34 in which the disc has never been taken out of the cartridge; FIG. 3(b) shows a state of the indicator pin 34 in which the disc that has been taken out of the cartridge has been just loaded in the recording and reproducing apparatus and no check has been made on disc type and disc sides; and FIG. 3(c) shows a state of the indicator pin 34 in which the disc taken out of the cartridge has been checked for disc type and disc sides by the recording and reproducing apparatus. If the marker has been recorded on the disc before being taken out and the marking has been performed on both sides of the disc, the indicator pin can be omitted. If the disc has never been taken out of the cartridge, one end of the indicator pin 34 is flush with the front surface of the cartridge as shown in FIG. 3(a). In this case, the above-mentioned ordinary desired operation (recording, reproducing or standby) is performed.

It will be apparent that the above-mentioned cap fixing pin that moves reversibly may also act as the indicator pin. In this case, for example, the pin of FIG. 3 is elongated slightly such that the pin protrudes a little bit from the front surface and the back surface of the cartridge at the position of FIG. 3 (a) and at the position of FIG. 3(b) respectively to be mated with a dent of the cap. When the pin is at the position of FIG. 3(b), it is so constituted that the cap is kept closely until a force is applied by a small projection of the cap and a dent of the body of the cartridge for example.

If the disc has been taken out of the cartridge once, the indicator pin is at the position shown in FIG. 3(b). The cartridge in this state may be inserted erroneously in an optical disc other than the DVD-RAM or may be inserted in a correct cartridge with the wrong side up.

In such a case, the operation such as shown in FIG. 2(b) is automatically performed by the recording and reproducing apparatus. First, the disc accommodated in the cartridge is reproduced to determine when the disc is a DVD-RAM disc. If the disc in the inserted cartridge is found to be other than a DVD-RAM disc (for example, if the disc is a CD-ROM disc), then such a disc cannot be reproduced and therefore a message thereof (for example, "This disc is not a DVD-RAM disc; reinsert a DVD-RAM disc into the cartridge") is shown on the display, upon which the cartridge is automatically ejected from the recording and reproducing apparatus.

If the disc is found to be a desired DVD-RAM disc, it is checked, in the next step, whether the front surface of the cartridge and the front surface of the disc are in the same direction. In the present embodiment, the marker indicating the front surface or the back surface is recorded on the inner periphery portion (outside the recording area) before the disc is taken out of the cartridge, so that, if the disc is inserted with the front and back sides inverted, a message thereof (for example, "The sides of the disc are wrong; take out the disc and reinsert with correct sides.") is shown on the display, upon which the cartridge is ejected from the recording and reproducing apparatus. The marker for indicating the front surface or the back surface (side A or side B or which recording film for a disc having two layers of recording and reproducing films) may be recorded before the disc is taken out as mentioned above or recorded at factory in advance.

If the disc is found to be inserted with the correct sides, the position of the indicator pin 34 is put in the state of FIG. 3(c) and then a next desired operation is performed. In this case, however, it is possible that taking the disc out of the cartridge has caused the disc surfaces to be contaminated with finger prints or dust, significantly decreasing the reliability of the data portion of the disc. Therefore, before the next desired operation is performed, an instruction for reinforcing ECC (Error Correction Coding) and the like is issued. Further, verification is always performed immediately after recording to make sure that the recording has been performed without error. In some cases, only one of these operations, the reinforcement and the verification, may be performed. Also, the verification may be performed when the disc is kept in the cartridge.

For the structure in which the pin fixing the body of the cartridge with the cap moves reversibly, when the position of the indicator pin 34 is as shown in FIG. 3(c), the pin is moved such that the body and cap are fixed together. Even for their reversible structure in which the fixing pin is compressed, if the disc reinserted in the cartridge is allowed for recording and reproducing, the cap is adapted to be fixed at closed position by the combination of the small projection on the cap and the dent on the cartridge body, in addition to the pin.

There may be two states (the cartridge with the cap open or the cartridge with the cap closed) for the indicator pin or the fixing pin also serving as the indicator pin. In this case, if, in the flowchart of FIG. 2(b), the front surface and the back surface are found to be in place, the position of the indicator pin or the fixing pin also serving as the indicator pin is put in the state of FIG. 3(a) and information telling that this disc has been taken out once is written to a predetermined position on the disc, so that verification and other processing can be performed when the disc taken out of the cartridge is set to the same or another apparatus. Because this recording must be performed on both sides of the disc, an apparatus having the optical head only on one side requires to turn the disc upside down. In the structure in which no indicator pin is provided and the marker indicating disc taking-out is recorded on the disc (on both sides for a double-sided disc), there is of course no need for moving the indicator pin. The detection of the indicator pin or the pin may be performed either mechanically or optically.

Intention of the user to take out the disc may be indicated to the system from the keyboard or a pointing device such as the mouse of the personal computer or the remote control or the like of a set top box. Alternatively, the intention may be directly transmitted to the recording and reproducing apparatus through the push-button or touch panel provided on the recording and reproducing apparatus or through a remote controller or the like. In the latter case, preferably the information of the intention is transmitted from the recording and reproducing apparatus to the personal computer or the control unit such as the microcomputer in the set top box of television.

FIG. 7 shows a cross section of a structure of a single-plate DVD-RAM disc in a second embodiment of the invention. A polycarbonate substrate 8" 120 mm in diameter and 0.6 mm in thickness is first formed, by magnetron spattering, with a dielectric material layer 9" made of ZnS-SiO to a thickness of about 110 nm. Then, a recording film 10" made of Cr-Ge-Sb-Te is formed on the dielectric material layer 9" to a thickness of about 20 nm. On the recording layer, another dielectric material layer 11" made of ZnS-SiO is formed by a thickness of about 20 nm. Further, on the dielectric material layer 11", an Si layer 12" is formed to a thickness of about 100 nm, which in turn has formed thereon an Mo reflection layer 13" by a thickness of about 100 nm. These films are formed sequentially in a same spattering unit. Then, a UV-light curing resin layer 14" is formed on the Mo reflection layer. The resultant layers are bonded to a polycarbonate substrate (protective plate) having a diameter of 120 mm and a thickness of 0.6 mm with hot melt adhesive 15".

A structure of the recording and reproducing apparatus of the second embodiment is generally the same as that of the first embodiment. The difference lies in that recording and reproducing are performed only from the substrate 8" formed with the recording film, resulting in an operation slightly different from that of the first embodiment. Referring to FIG. 2(b), if reproduction of the disc in the cartridge fails at the first attempt, the disc may not be a DVD-RAM disc or the disc may have been inserted in the cartridge with wrong sides. If this happens, a message thereof (for example, "This disc is not a DVD-RAM disc" or "The sides of the disc are wrong; reinsert with correct sides.") is shown on the display, upon which the cartridge is automatically ejected from the recording and reproducing apparatus.

FIG. 8(a) is a top view illustrating another structure of the cartridge in a third embodiment of the invention. FIGS. 8(b) and 8(c) are schematic diagrams illustrating states in which the disc is taken out of the cartridge according to the third embodiment. This cartridge has a structure in which a cap 2 of the cartridge which can be removed in one direction is about ⅓ of the width of the cartridge as shown in FIG. 8(a). Preferably, the width of the cap 2 of the cartridge at right angles to the sliding direction (up and down in the figure) of a shutter 3 is less than ½ and more than ¹⁄₁₀ of the width of the cartridge for easy handling. When taking out the disc, the recording and reproducing apparatus performs a regular operation (of unlatching pins 4) as with the first embodiment. Consequently, the cap 2 of the cartridge can be easily separated from a body 1 as shown in FIG. 8(b). To take out a disc 5, the shutter 3 is slid as shown in FIG. 8(c) to expose a center hole 6 of the disc and an outer rim 7. In this state, the user holds the disc 5 by fingers at the center hole 6 and the outer rim 7 and takes out the disc 5 from the body 1 (to the right side in the figure), so that the user can take the disc from the cartridge without substantially contaminating the disc surfaces with finger prints. Also, because the cap of the cartridge can be separated from the cartridge body, the disc can be taken out of the cartridge without being hindered by the cartridge cap.

Use of the cartridge having the above-mentioned structure in which the cap 2 of the cartridge is adapted to be completely separated from the body 1 of the cartridge also allows the recording and reproducing apparatus to perform all operations up to and including the taking of the disc out of the cartridge. For example, when an "execute take-out" instruction has been issued from the personal computer, the pins 4 are unlatched on the side of the recording and reproducing apparatus, with only the cap 2 being mechanically ejected from the apparatus. When the cap 2 is removed by hand, the disc 5 comes out of the apparatus. The user holds the disc 5 by fingers at the center hole 6 and the outer rim 7 and takes the disc out of the apparatus. Then, the body 1 of the cartridge automatically comes out of the apparatus.

Figure 9A:
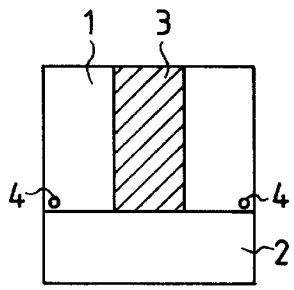
FIG. 9(a) is a top view illustrating a structure of a cartridge practiced as a fourth preferred embodiment of the invention.
Figure 9B:
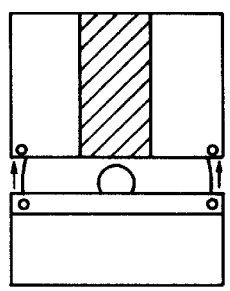
FIG. 9(b) is a schematic view illustrating a state in which a disc is taken out of the cartridge of the fourth preferred embodiment of the invention.
Figure 9C:
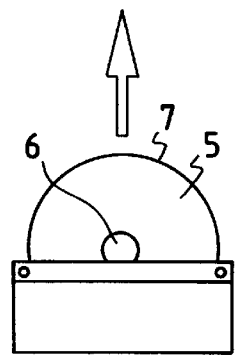
FIG. 9(c) is another schematic view illustrating a state in which the disc is taken out of the cartridge of the fourth preferred embodiment of the invention.

FIG. 9(a) is a top view illustrating still another example of the structure of the cartridge. FIGS. 9(b) and 9(c) are schematic diagrams illustrating states in which the disc is taken out of the cartridge. In this structure, a cap 2 of the cartridge can be removed in one direction at a position about ⅓ of the width of the cartridge as shown in FIG. 9(b). Preferably, the width of the cap 2 of the cartridge at right angles to the sliding direction (right and left directions in the figure) of a shutter 3 is less than ⅔ and more than ⅕ of the width of the cartridge. When taking out the disc, the recording and reproducing apparatus performs a preparatory operation (unlatching pins 4) for taking out the disc. Therefore, moving a disc 5 toward the cap of the cartridge allows the user to take off a body 1 easily. This exposes a center hole 6 of the disc and an outer rim 7 of the disc as shown in FIG. 9(c). In this state, the user holds the disc by fingers at the center hole 6 and the outer rim 7 and takes the disc 5 out of the cap 2 (in the up direction in the figure), so that the user can take the disc from the cartridge without substantially contaminating the disc surfaces with finger prints. This also prevents the user from taking out the disc inadvertently.

Figure 10A:
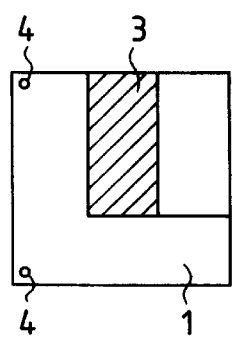
FIG. 10(a) is a top view illustrating a structure of a cartridge practiced as a fifth preferred embodiment of the invention.
Figure 10B:
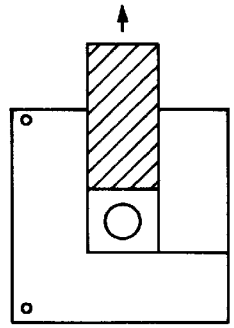
FIG. 10(b) is a schematic view illustrating a preliminary operation for taking a disc out of the cartridge of the fifth preferred embodiment.
Figure 10C:
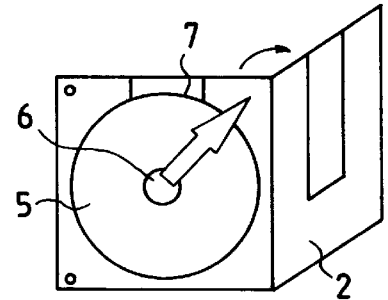
FIG. 10(c) is a schematic diagram illustrating a state in which the disc is taken out of the cartridge of the fifth preferred embodiment.

FIG. 10(a) is a top view of yet another example of the structure of the cartridge. FIGS. 10(b) and 10(c) are schematic diagrams illustrating states in which the disc is taken out of the cartridge. In the structure of the present embodiment, when taking out the disc, the recording and reproducing apparatus performs a preparatory operation (unlatching pins 4) for taking out the disc as shown in FIG. 10(a). First, as shown in FIG. 10(b), the user removes a shutter 3. Then, as shown in FIG. 10(c), the user opens a cap on the upper side of the cartridge. This exposes a center hole 6 of the disc and an outer rim 7 of the disc. In this state, the user holds the disc 5 by fingers at the center hole 6 and the outer rim 7 and takes out the disc from the cartridge without substantially contaminating the disc surfaces with finger prints. This also prevents the user from taking the disc out of the cartridge inadvertently.

As described, the cartridge according to the invention protects the recording medium accommodated therein from being taken out erroneously. The recording and reproducing apparatus according to the invention protects the recording medium from being taken out of the cartridge set on the recording and reproducing apparatus inadvertently. Further, the recording and reproducing system according to the invention protects, by means of software incorporated therein, the recording medium from being taken out of the cartridge inadvertently.

What is claimed is:

1. A cartridge for holding an information recording medium therein for recording and reproducing information thereto and therefrom by irradiation of an energy beam, said cartridge comprising;
    a body;
    a cap connected to said body and adapted to be separated or opened from said body;
    at least one window provided on said cartridge;
    a shutter for opening and closing said window to allow a recording and reproducing head to access said information recording medium through said window; and
    an indicating means for indicating whether said information recording medium never has been removed from said cartridge or has been picked out from said cartridge at least once and returned into said cartridge, said indicating means being movable reversibly.

2. A cartridge according to claim 1 wherein said indicating means comprises pin means mounted on said cartridge.

3. A cartridge according to claim 1 wherein
    said cartridge further has locking means for fixing said cap to said body in a closed state;
    said locking means being releasable by releasing means provided on a recording and reproducing apparatus on which said cartridge is set, such that said body and said cap are separated from each other or said cap is opened from said body in a manner that said information recording medium is removable from said cartridge.

4. A cartridge according to claim 3 wherein said locking means comprises a locking pin and said releasing means comprises a punch pin mechanism on said recording and reproducing apparatus.

5. A cartridge according to claim 1
    wherein said window is openable in a direction in which said information recording medium is taken out of said cartridge.

6. An information recording and reproducing apparatus comprising;
    a cartridge having
    a body;
    a cap adapted to be separated from or opened and closed on said body;
    at least one window provided on said cartridge;
    an information recording medium accommodated in said cartridge to allow information to be recorded to and reproduced from said information recording medium by irradiation of an energy beam;
    a recording and reproducing head for recording to said information recording medium and reproducing from said information recording medium;
    said cartridge further having a shutter for opening and closing said window to allow said recording and reproducing head to access said information recording medium through said window; and
    an indicating means for indicating whether said information recording medium never has been removed from said cartridge or has been removed from said cartridge at least once and returned into said cartridge, said indicating means being movable reversibly.

7. An information recording and reproducing apparatus according to claim 6 wherein said indicating means comprises pin means mounted on said cartridge.

8. An information recording and reproducing apparatus according to claim 6 wherein
    said cartridge further has a locking means for fixing said cap to said body in a closed state;
    said locking means being releasable by releasing means provided on a recording and reproducing apparatus on which said cartridge is set, such that said body and said cap are separated from each other or said cap is opened from said body in a manner that said information recording medium is removable from said cartridge.

9. An information recording and reproducing apparatus according to claim 8 wherein said locking means comprises a locking pin and said releasing means comprises a punch pin mechanism on said recording and reproducing apparatus.

10. An information recording and reproducing apparatus comprising;
    a cartridge having
    a body;
    a cap adapted to be separated from or opened and closed on said body; and
    at least one window provided on said cartridge;
    an information recording medium accommodated in said cartridge to allow information to be recorded to and reproduced from said information recording medium by irradiation of an energy beam;
    a recording and reproducing head for recording to said information recording medium and reproducing from said information recording medium;
    said cartridge further having a shutter for opening and closing said window to allow said recording and reproducing head to access said information recording medium through said window;
    an indicating means for indicating whether said information recording medium never has been picked out from said cartridge or has been removed from said cartridge at least once and returned into said cartridge; and
    a control unit for controlling said information recording and reproducing apparatus;
    said control unit being installed with a program for reconfirming taking out of said information recording medium from said cartridge.

11. An information recording reproducing apparatus according to claim 10 wherein said indicating means comprises pin means mounted on said cartridge removed from said cartridge.

12. An information recording and reproducing apparatus according to claim 10 wherein
said cartridge further has locking means for fixing said cap to said body in a closed state;
said locking means being releasable by releasing means provided on a recording and reproducing apparatus on which said cartridge is set, such that said body and said cap are separated from each other or said cap is opened from said body in a manner that said information recording medium is removable from said cartridge.

13. A cartridge according to claim 12 wherein said locking means comprises a locking pin and said releasing means comprises a comprises a punch pin mechanism on said recording and reproducing apparatus.

* * * * *